(12) United States Patent
Dhar et al.

(10) Patent No.: US 11,507,399 B1
(45) Date of Patent: Nov. 22, 2022

(54) ENABLING SCREEN-SHARE IN ONLINE MEETING PLATFORM BASED ON VIRTUAL DESKTOP

(71) Applicant: Cisco Technology, Inc., San Jose, CA (US)

(72) Inventors: Rajarshee Dhar, Assam (IN); Ram Mohan Ravindranath, Bangalore (IN); Deepesh Arora, Punjab (IN); Faisal Siyavudeen, Kerala (IN); Mingfeng Yang, Hefei (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/329,696

(22) Filed: May 25, 2021

(51) Int. Cl.
```
G06F 9/451      (2018.01)
G06F 3/0485     (2022.01)
G06F 3/04842    (2022.01)
G06F 3/14       (2006.01)
G06F 3/0481     (2022.01)
```

(52) U.S. Cl.
CPC ............ *G06F 9/452* (2018.02); *G06F 3/0481* (2013.01); *G06F 3/0485* (2013.01); *G06F 3/04842* (2013.01); *G06F 3/1454* (2013.01)

(58) Field of Classification Search
CPC .... G06F 9/452; G06F 3/0481; G06F 3/04842; G06F 3/0485; G06F 3/1454
See application file for complete search history.

(56) References Cited

U.S. PATENT DOCUMENTS

| | | | |
|---|---|---|---|
| 5,758,110 A | 5/1998 | Boss et al. | |
| 6,229,537 B1* | 5/2001 | Sobeski | G09G 5/14 715/781 |
| 8,185,828 B2 | 5/2012 | Liu et al. | |
| 8,850,351 B2 | 9/2014 | Beharie et al. | |
| 8,972,485 B1 | 3/2015 | French et al. | |
| 10,462,194 B2 | 10/2019 | Darbha et al. | |
| 2004/0024819 A1* | 2/2004 | Sasaki | H04L 12/1813 709/205 |
| 2005/0132299 A1 | 6/2005 | Jones et al. | |

(Continued)

OTHER PUBLICATIONS

Markus Scholtes, "VirtualDesktop/VirtualDesktop.cs at master • MScholtes/VirtualDesktop", GitHub, Inc., Version 1.8, Dec. 3, 2020, 45 pages.

(Continued)

*Primary Examiner* — Justin R. Blaufeld
(74) *Attorney, Agent, or Firm* — Edell, Shapiro & Finnan, LLC

(57) ABSTRACT

A method comprises: at a computer device configured with user applications grouped in multiple virtual desktops hosted on and displayed by the computer device: establishing an online meeting with remote computer devices over a network; responsive to user input, selecting one of the multiple virtual desktops to be a shared virtual desktop, such that all other ones of the multiple virtual desktops become unshared virtual desktops; sharing, with the remote computer devices, the shared virtual desktop, including first user applications of the user applications that are grouped in the shared virtual desktop; and not sharing, with the remote computer devices, any of the unshared virtual desktops and second user applications of the user applications that are grouped in the unshared virtual desktops.

20 Claims, 10 Drawing Sheets

(56) References Cited

U.S. PATENT DOCUMENTS

| | | |
|---|---|---|
| 2006/0136828 A1* | 6/2006 | Asano .................. G06F 3/1454 715/764 |
| 2006/0168533 A1 | 7/2006 | Yip et al. |
| 2007/0239828 A1* | 10/2007 | Patton .................... G06Q 10/10 709/204 |
| 2007/0288640 A1 | 12/2007 | Schmieder et al. |
| 2008/0034317 A1* | 2/2008 | Fard ........................ G06T 13/80 715/781 |
| 2009/0083655 A1* | 3/2009 | Beharie .................. G06F 9/451 715/781 |
| 2009/0153751 A1* | 6/2009 | Asakura .................. H04N 9/31 348/744 |
| 2009/0300510 A1 | 12/2009 | Gantman et al. |
| 2010/0122184 A1 | 5/2010 | Vonog et al. |
| 2010/0131868 A1* | 5/2010 | Chawla ................. G06F 3/0481 715/759 |
| 2010/0262925 A1* | 10/2010 | Liu ........................ G06Q 10/10 715/759 |
| 2010/0293504 A1* | 11/2010 | Hachiya ................ G06F 3/1423 715/806 |
| 2011/0029915 A1* | 2/2011 | Harris ...................... G09G 5/14 715/781 |
| 2011/0181492 A1* | 7/2011 | Soeda ...................... G09G 5/14 345/1.1 |
| 2011/0252366 A1 | 10/2011 | Balasubramanian et al. |
| 2011/0314387 A1 | 12/2011 | Gold et al. |
| 2013/0305166 A1* | 11/2013 | Bastide ............... H04L 65/4038 715/753 |
| 2014/0006974 A1* | 1/2014 | Bell .................... H04L 12/1822 715/753 |
| 2015/0067591 A1* | 3/2015 | Nancke-Krogh ..... G06F 3/1454 715/804 |
| 2015/0149404 A1 | 5/2015 | Lock et al. |
| 2015/0356773 A1* | 12/2015 | Kumar ................ G06F 9/45558 345/520 |
| 2016/0147400 A1 | 5/2016 | Patten et al. |
| 2017/0024100 A1 | 1/2017 | Pieper et al. |
| 2018/0341374 A1 | 11/2018 | Faulkner et al. |
| 2019/0068390 A1 | 2/2019 | Gross et al. |
| 2019/0166330 A1 | 5/2019 | Ma et al. |
| 2020/0293261 A1* | 9/2020 | Janamanchi ........ H04L 12/1831 |
| 2021/0044976 A1* | 2/2021 | Avetisov ................ H04L 9/321 |
| 2021/0181908 A1* | 6/2021 | Jitkoff .................. G06F 3/0482 |
| 2021/0351946 A1* | 11/2021 | Chanda ............... H04L 12/1822 |

OTHER PUBLICATIONS

Microsoft, "IVirtualDesktopManager::MoveWindowToDesktop method (shobjidl_core.h)", Dec. 5, 2018, 2 pages.

Michael Zomparelli, "Home", GitHub, Nov. 16, 2020, 3 pages.

Song Ho, "OpenGL Frame Buffer Object (FBO)", retrieved from Internet May 25, 2021, 6 pages; http://www.songho.ca/opengl/gl_fbo.html.

Markus Scholtes, "Virtual Desktop", GitHub, Inc., Version 1.8, Dec. 3, 2020, 4 pages.

Microsoft, "Teams is sharing virtual desktop", Aug. 21, 2020, 2 pages. https://answers.microsoft.com/en-us/msteams/forum/all/teams-is-sharing-virtual-desktop/b8fe6a07-efbb-44a5-968a-7947d6170938.

* cited by examiner

METADATA
502

{
Window : Desktop number {
Note: 1
facebook: 1
Chrome: 2
Powerpoint: 2
Skype:3
Word:3
}
}

VIRTUAL DESKTOP IDENTIFICATION

UPDATED METADATA
502

{
Window: current Desktop number, previous Desktop number
{
Note: 1,1
facebook: 1,1
Chrome: 2,2
Powerpoint: 2,2
Skype:3,2
Word:2,3 --> This is updated
}
}

US 11,507,399 B1

ENABLING SCREEN-SHARE IN ONLINE MEETING PLATFORM BASED ON VIRTUAL DESKTOP

TECHNICAL FIELD

The present disclosure relates to screen sharing in an online meeting using virtual spaces.

BACKGROUND

The manner in which a presenter in an online meeting can share screen content with other participants is generally limited to the following two options: share an individual user application (e.g., Adobe or Word) or share an entire screen. There is no middle ground. When the presenter is sharing a first user application and wishes to start sharing a second user application, the presenter is forced to stop sharing the first user application, and then start sharing the second user application. This stop/start sharing sequence creates an undesirable break in user attention and hinders delivery of a smooth presentation. To avoid such interruptions, the presenter may share the entire screen, but only at the cost of losing local privacy. That is, while sharing the entire screen and performing local private actions that are not intended to be shared, the presenter may leak sensitive content because the entire screen is visible to the other participants.

DESCRIPTION OF EXAMPLE EMBODIMENTS

Overview

A computer device performs a method. The computer device is configured with user applications grouped in multiple virtual desktops hosted on and displayed by the computer device. The computer device establishes an online meeting with remote computer devices over a network and, responsive to user input, selects one of the multiple virtual desktops to be a shared virtual desktop. All other ones of the multiple virtual desktops become unshared virtual desktops. The computer device shares, with the remote computer devices, the shared virtual desktop, including first user applications of the user applications that are grouped in the shared virtual desktop. The computer device does not share, with the remote computer devices, any of the unshared virtual desktops and second user applications of the user applications that are grouped in the unshared virtual desktops.

Example Embodiments

Figure 1:
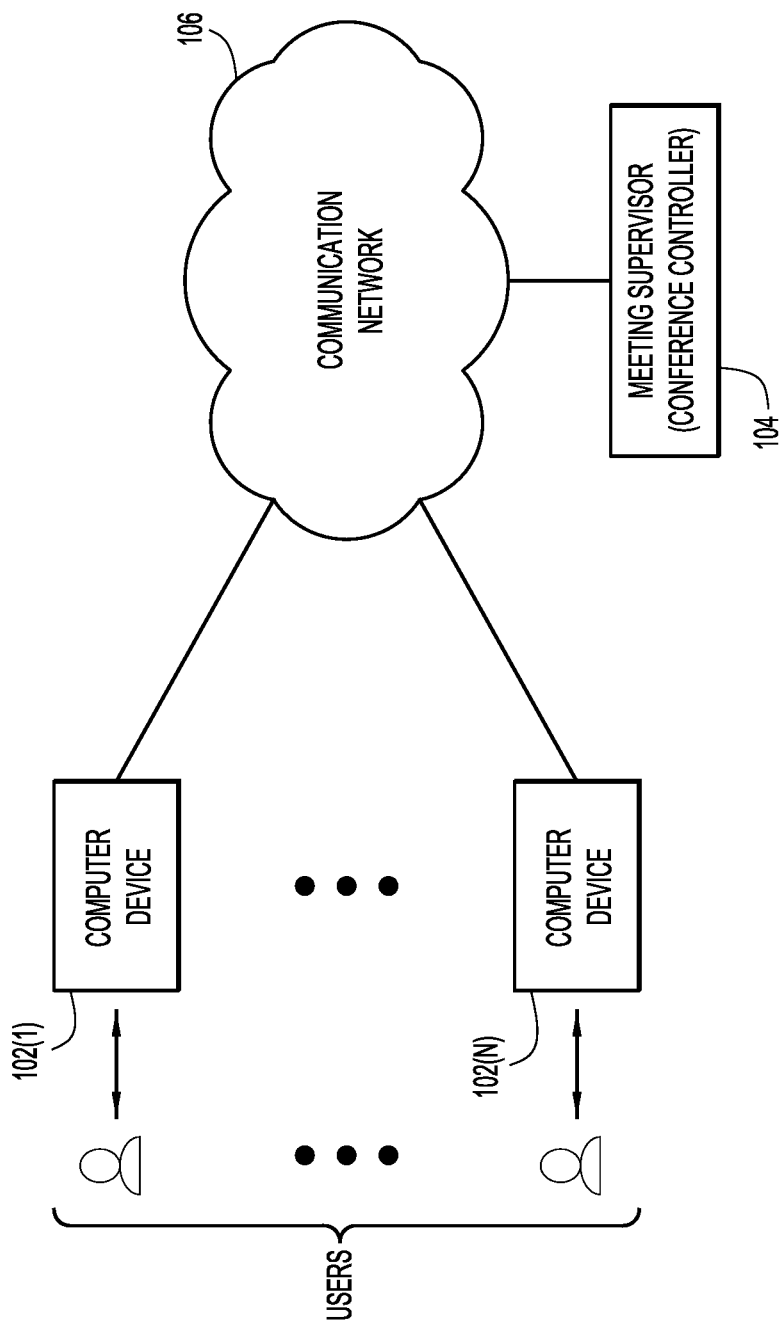
FIG. 1 is a block diagram of an example online meeting environment in which screen content sharing in an online meeting using control of virtual desktops may be implemented, according to an example embodiment.

Referring first to FIG. 1, there is a block diagram of an example online meeting environment 100 in which screen sharing embodiments presented herein may be implemented. Environment 100 includes multiple computer devices 102(1)-102(N) (collectively referred to as computer devices, participant devices, or platforms) operated by local users/participants, a meeting supervisor or server (also referred to as a "conference controller") 104 configured to support online (e.g., web-based or over-a-network) collaborative meetings between the computer devices, and a communication network 106 communicatively coupled to the computer devices and the meeting supervisor. Computer devices 102 can take on a variety of forms, including a SmartPhone, tablet, laptop computer, desktop computer, video conference (e.g., Telepresence) endpoint, and the like. Communication network 106 may include one or more wide area networks (WANs), such as the Internet, and one or more local area networks (LANs). Computer devices 102 may communicate with each other, and with meeting supervisor 104, over communication network 106 using a variety of known or hereafter developed communication protocols. For example, the computer devices 102 and meeting supervisor 104 may exchange Internet Protocol (IP) data packets, Real-time Transport Protocol (RTP) media packets (e.g., audio and video packets), and so on.

Computer devices 102 may each host virtual desktops and an online meeting application used to establish/join online meetings and control screen sharing between participant computer devices during the online meetings according to embodiments presented herein. As used herein, the term "virtual desktop" generally refers to a "virtual space" hosted on a computer device and that presents to a user a set of user preferences, user applications, and shortcuts to files/applications/content that the user may wish to access. When the computer device hosts multiple virtual desktops, a user may switch between "active" ones of the virtual desktops at any given time. There are variety of known computer operating systems (OSs) that provide virtual desktop instantiation and manipulation options, such as versions of the Mac OS and the Windows OS.

According to embodiments presented herein, when a computer device 102(i) joins an online meeting under control of the online meeting application, a user of the computer device can control sharing of screen content (referred to as "screen sharing") from virtual desktops hosted on the computer device to other computer devices joined to the online meeting. The computer device that shares screen content to the other computer devices may be referred to as the "presenter computer device" or simply the "presenter device," while the other computer devices may be referred to as the "remote computer devices" or "recipient computer devices" (with respect to the presenter computer device). The shared screen content may include all forms of media, including, but not limited to, voice, video, text, images and the like. The screen content may also include presentations or displays of user applications with their associated media/data and/or windows with their associated media/data, and virtual desktops. As used herein, the terms "screen content" and "content" may be used interchangeably, the terms "screen sharing" and "content sharing" may be used interchangeably, and a "computer device" may be referred to simply as a "computer."

Several disadvantages of conventional screen sharing that arise when a computer acting as a presenter device shares virtual desktops in an online meeting are now described in connection with FIGS. 2 and 3. Then, screen sharing embodiments presented herein that overcome the disadvantages and offer other advantages are described in connection with FIGS. 4-11.

Figure 2:
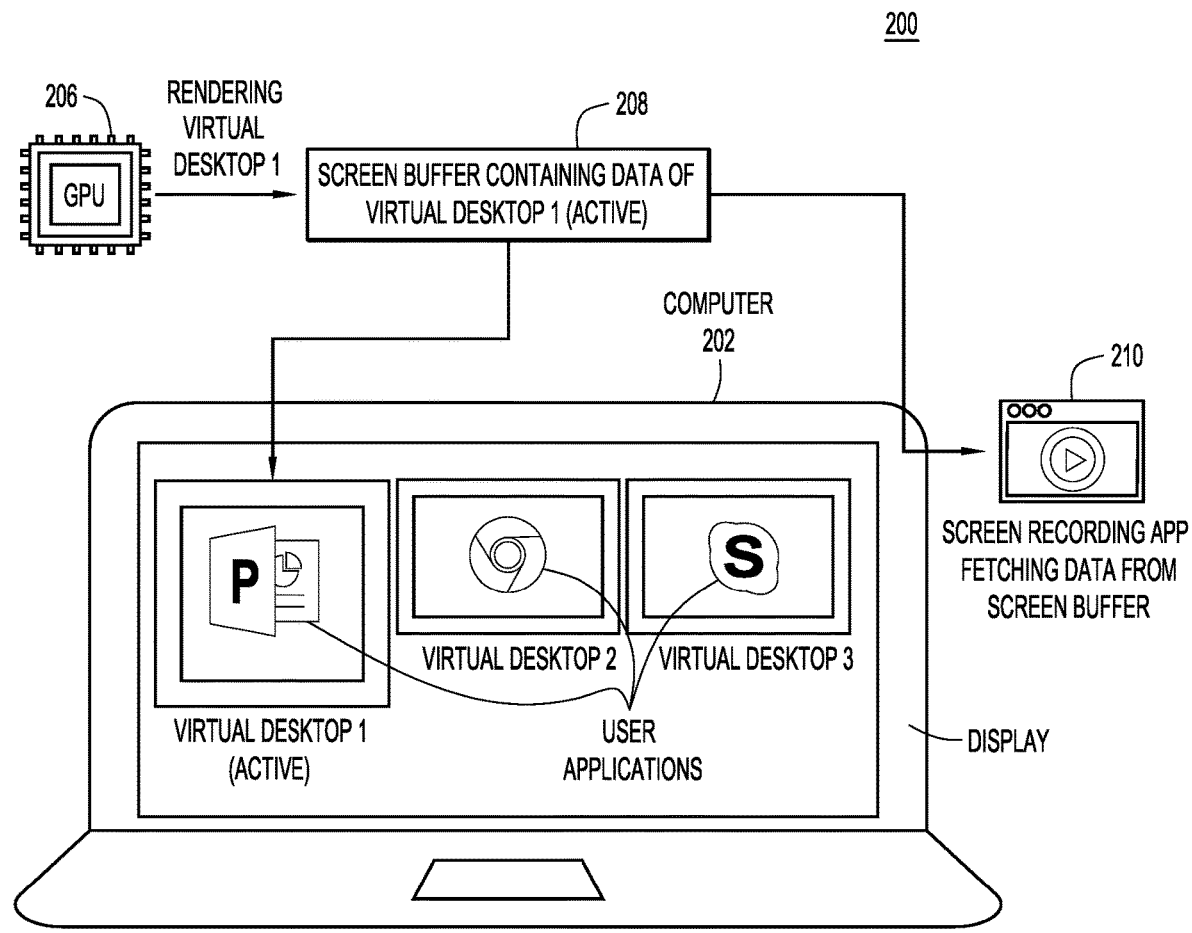
FIG. 2 is an illustration of a conventional technique used to share content from a first virtual desktop hosted on a computer device joined to an online meeting.

With reference to FIG. 2, there is an illustration of conventional screen sharing 200 associated with a first virtual desktop hosted on a computer 202 joined to an online meeting. Computer 202 includes a graphics processing unit (GPU) 206 and a dedicated screen (frame) buffer 208. Computer 202 hosts virtual desktops 1-3 that are presented on a display of the computer, as shown. Virtual desktops 1-3 share screen buffer 208. Computer 202 is configure with or hosts a screen recording and sharing application 210 (also referred to simply as "sharing application 210"). For purposes of clarity only, GPU 206, screen buffer 208, and screen sharing application are shown separated from computer 202 in FIG. 2.

Sharing application 210 typically provides both screen sharing and recording options, and may be implemented in any conventional online meeting application, for example. GPU 206 renders an active content area on the display into screen buffer 208, as rendered data. The content area may be active because a user has designated the content area as active, or is otherwise accessing the content area. Sharing application 210 retrieves the rendered data from screen buffer 208 and transmits the rendered data to remote computers as shared objects, and/or records the rendered data.

As the user of computer 202 activates/accesses virtual desktops 1-3 in sequence, for example, GPU 206 renders their respective screen content in sequence. Sharing application 210 retrieves the rendered data (for the active virtual desktop) from screen buffer 208, and pushes the rendered data to, i.e., shares it with, remote computers. In the example of FIG. 2, virtual desktop 1 is active. Thus, sharing application 210 shares screen content for virtual desktop 1. Assume the user switches the active virtual desktop from virtual desktop 1 to virtual desktop 2. Screen sharing also switches from virtual desktop 1 to virtual desktop 2, as shown in FIG. 3.

Figure 3:
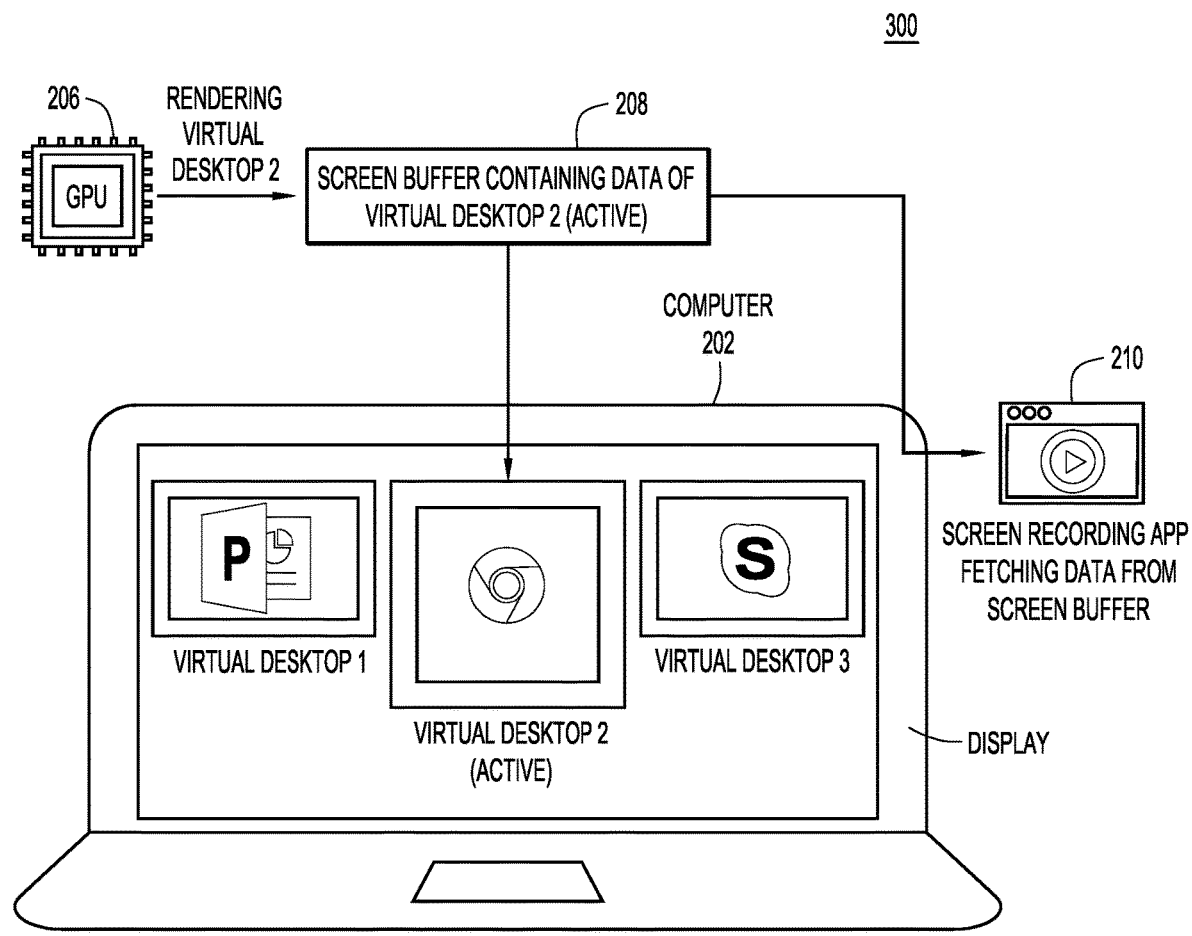
FIG. 3 is a further illustration of the conventional technique after a switch from the first virtual desktop to a second virtual desktop hosted on the computer device.

With reference to FIG. 3, there is a further illustration of conventional screen sharing 300 after the above-mentioned switch from virtual desktop 1 to virtual desktop 2. As shown in FIG. 3, virtual desktop 2 is now active. Thus, sharing application 210 shares screen content from virtual desktop 2, not virtual desktop 1. In the event that the user performs work in virtual desktop 2, e.g., to create, edit, or simply access, content, GPU 206 renders the content from virtual desktop 2 into frame buffer 208, and sharing application 210 pushes the resulting rendered data to the other computers, which may result in undesired disclosure of private information.

According to embodiments presented herein, a computer hosts multiple virtual desktops and an online meeting application configured to implement screen sharing with respect to virtual desktops under control of a user in a manner that overcomes the above-described problems and offers other advantages, such as seamless screen share control. For example, when the computer has joined an online meeting, the online meeting application provides the user with a capability to select one of the multiple virtual desktops as a "shared virtual desktop" to be shared with other/remote computers also joined to the online meeting. This results in only sharing the shared virtual desktop and one or more applications (e.g., Word and PowerPoint) present in the shared virtual desktop with the other computers, while not sharing the other virtual desktops (i.e., the "unshared" virtual desktops) with the other computers. The unshared virtual desktops are not shared even when the user accesses content in the unshared virtual desktops, while the shared virtual desktop is being shared. Thus, the user may privately access screen content in the unshared virtual desktops locally during the online meeting (such that the privately accessed content is not shared externally), while the shared virtual desktop continues to be shared externally.

The online meeting application provides additional flexibility with respect to sharing screen content. For example, the user can simply drag user applications into and out of the shared virtual desktop to share and stop sharing the dragged user applications, respectively. From the perspective of the user, this feature seamlessly adds sharing of applications that were previously not shared to the current sharing experience, and avoids undesired stop/start sharing interruptions described above.

To implement the above-mentioned screen sharing features, the online meeting application tracks which user applications (e.g., Word, PowerPoint, Adobe, and so on) are in which virtual desktops on the computer. For example, the online meeting application links or maps the user applications to their corresponding virtual desktops and maintains the mapping information as metadata in memory of the computer. When the user selects a particular virtual desktop to be shared with the other computers, the online meeting application (i) designates that virtual desktop as the shared virtual desktop, (ii) scans the metadata to identify the user application/window objects (collectively "user applications") that correspond to (i.e., are in) the shared virtual desktop, and (iii) only shares those user applications with the other computers, i.e., restricts sharing of screen content to the shared virtual desktop and its user applications indicated in the metadata.

While the sharing is ongoing, when the user drags an additional user application from outside of the shared virtual desktop (and that is not currently being shared) into the shared virtual desktop, the online meeting application automatically identifies the dragged user application, updates the metadata to reflect the move, and then adds the dragged user application to the sharing. To stop sharing a user application, the user simply drags the user application out of the shared virtual desktop. The user application updates the metadata to reflect the removal, and then the user application stops sharing the user application.

The user application relies on the metadata to maintain privacy. For example, while the sharing is ongoing, when the user accesses a user application (referred to as the "accessed user application") that is not in the shared virtual desktop, the online meeting application scans the metadata and determines that the accessed user application (or other screen content) is not part of the shared virtual desktop, and does not share the accessed user application, even though the user has moved activity/focus to the accessed user application. Thus, actions and screen content associated with the accessed user application are not shared externally, and remain private.

An example method of screen sharing at a computer that implements the above-described features using virtual desktops is now described in connection with FIGS. 4-10. Beginning with FIG. 4, there is shown a computer 402 configured to implement the screen sharing method. Computer 402 may include a GPU and a screen buffer similar to that described above, but controlled in accordance with the embodiments presented herein. Computer 402 hosts an online meeting application (indicated at 410) that operates in accordance with the embodiments presented herein. In an example, the online meeting application may be a WebEx-based application extended or enhanced to add the features presented herein. As such, the online meeting application is configured to establish an online meeting with other/remote computers, join the computer to the online meeting, and control sharing and recording of content hosted on the computer under user control, as described below.

Figures 4, 5:
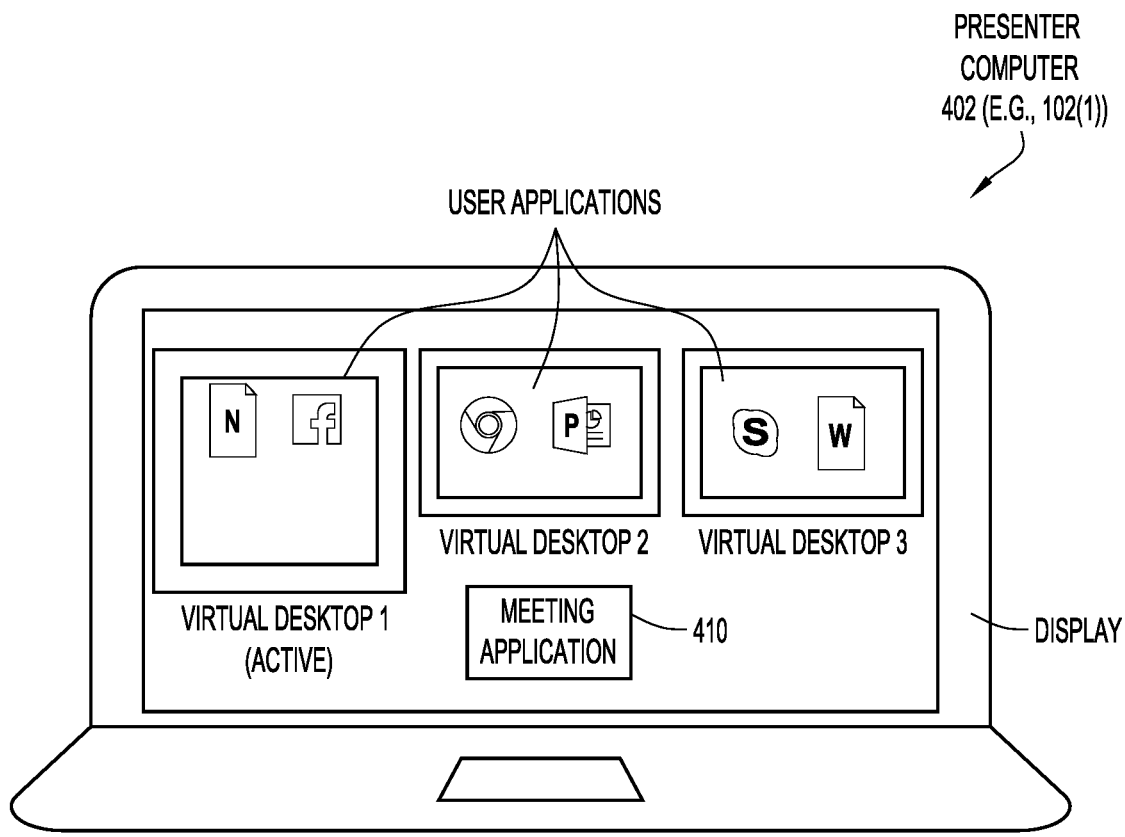
FIG. 4 shows a presenter computer device configured with user applications in virtual desktops hosted by the presenter computer device, and an online meeting application configured to implement screen content sharing with other (remote) computer devices during an online meeting using the virtual desktops, according to an example embodiment.
FIG. 5 is an illustration of metadata created by the online meeting application of FIG. 4 and used to support screen content sharing, according to an example embodiment.

Additionally, computer 402 hosts and displays multiple virtual desktops 1-3. The online meeting may be present in any one of virtual desktops 1-3, or may be outside of the virtual desktops. Support logic on computer 402 or the online meeting application assigns a distinct virtual desktop identifier (e.g., a number 1, 2, or 3) to each virtual desktop. Such support logic may be incorporated into the online meeting application, or may be part of a local operating system that communicates the virtual desktop identifiers to the online meeting application. Computer 402 is configured with multiple user applications that are grouped across multiple virtual desktops 1-3. That is, groups of one or more icons of the user applications are presented in corresponding ones of multiple virtual desktops 1-3. In the example of FIG. 4, icons of user applications Note and Facebook are grouped into virtual desktop 1, icons for user applications Chrome and PowerPoint are grouped into virtual desktop 2, and icons for user applications Skype and Word are grouped into virtual desktop 3.

The icons are identifiable representations of the user applications, and typically include shortcuts to the user applications. To access (e.g., execute or open) a user application in a virtual desktop, a user simply interacts with (e.g., clicks on) the icon/representation of the user application, as is known. From the perspective of the user, therefore, the presence of the icon in the virtual desktop effectively places the user application in the virtual desktop. Accordingly, in the ensuing description, phrases such as "an icon/representation of a user application is in a virtual desktop" and "a user application is in a virtual desktop" are synonymous and may be used interchangeably.

When computer 402 is joined to an online meeting, the online meeting application records a list of all of the user applications on the computer, including those that are currently open. In addition, the online meeting application creates and stores metadata that identifies which of the user applications are in which of multiple virtual desktops 1-3, i.e., which of the user applications are grouped into which of the multiple virtual desktops. The metadata includes mappings that map the distinct identifiers of multiple virtual desktops 1-3 to corresponding ones of the user applications that are located in the multiple virtual desktops, as shown in FIG. 5.

With reference to FIG. 5, there is an illustration of example metadata 502 created by the online meeting application after computer 402 has joined the online meeting. Metadata 502 includes numbers to identify the virtual desktop (e.g., virtual desktop 2) in which the corresponding applications are present (e.g., Chrome and PowerPoint). As shown in FIG. 5, each mapping entry/line of metadata 502 includes an identifier of a user application and an identifier of a corresponding virtual desktop where the user application is currently located.

Figure 6:
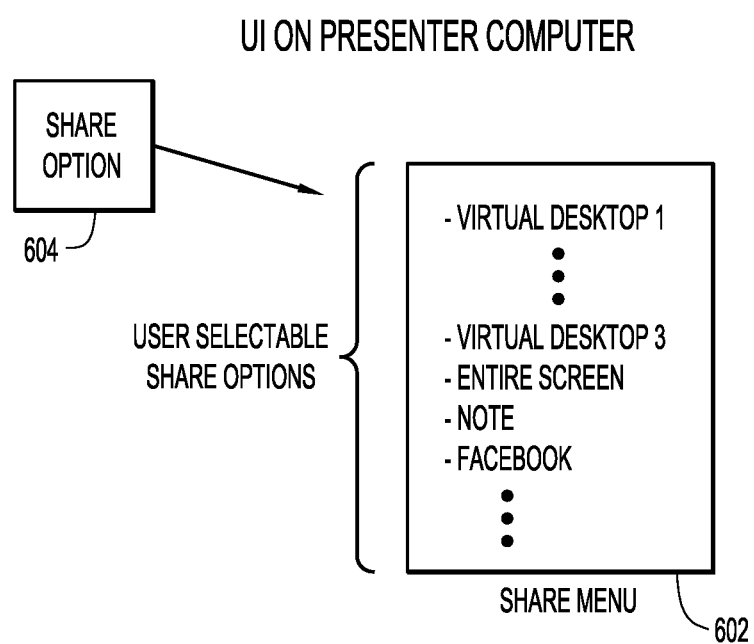
FIG. 6 is an illustration of a share menu presented on a display of the presenter computer device by the online meeting application and having user selectable share options from which a user can select a content object to be shared, according to an example embodiment.

After the online meeting application has created the metadata, the online meeting application presents a first user interface (UI) that includes a user selectable share option. When the online meeting application receives a selection of the share option from the user, the meeting application opens a second UI in the form of a share menu that lists user selectable objects, as shown in FIG. 6, for example. With reference to FIG. 6, there is an illustration of an example share menu 602 presented by the online meeting application responsive to user selection of share option 604. Share menu 602 includes/lists user selectable objects (i.e., more generally, user selectable options). The user selectable objects include each of virtual desktops 1-3, an entire/full screen, and the individual user applications Note, Facebook, Chrome, PowerPoint, Skype, and Word. A user selection of a particular object (e.g., one of the virtual desktops) from share menu 602 indicates to the online meeting application that the particular object is to be shared in the online meeting. In response to such selection, the online meeting application designates or tags the particular object to be a shared object, and performs the operations described below to restrict sharing to only the shared object, even when the user is focused on/accessing other screen objects that are not the shared objects.

Assume the online meeting application receives a user selection of virtual desktop 2 from share menu 602, which indicates that virtual desktop 2 is to be shared. Responsive to the selection, the online meeting application designates virtual desktop 2 as the shared object. In addition, support logic on computer 402 (which may or may not be part of the online meeting application) determines whether the online meeting application is in the shared virtual desktop, e.g., virtual desktop 2. The following two outcomes of the determination are possible:

a. The online meeting application is in virtual desktop 2.
  b. The online meeting application is not in virtual desktop 2.

In case (a), no additional action need be taken with respect to the online meeting application because, by default, the screen buffer of computer 402 records and transmits rendered data only from the active virtual desktop, which is virtual desktop 2 in this case. On the other hand, in case (b), computer 402 automatically "pushes" or "moves" the online meeting application from its current location (e.g., from whichever virtual desktop is currently active) to the shared virtual desktop (e.g., virtual desktop 2), so that the screen buffer records and transmits rendered data from virtual desktop 2, only.

Figures 7, 8:
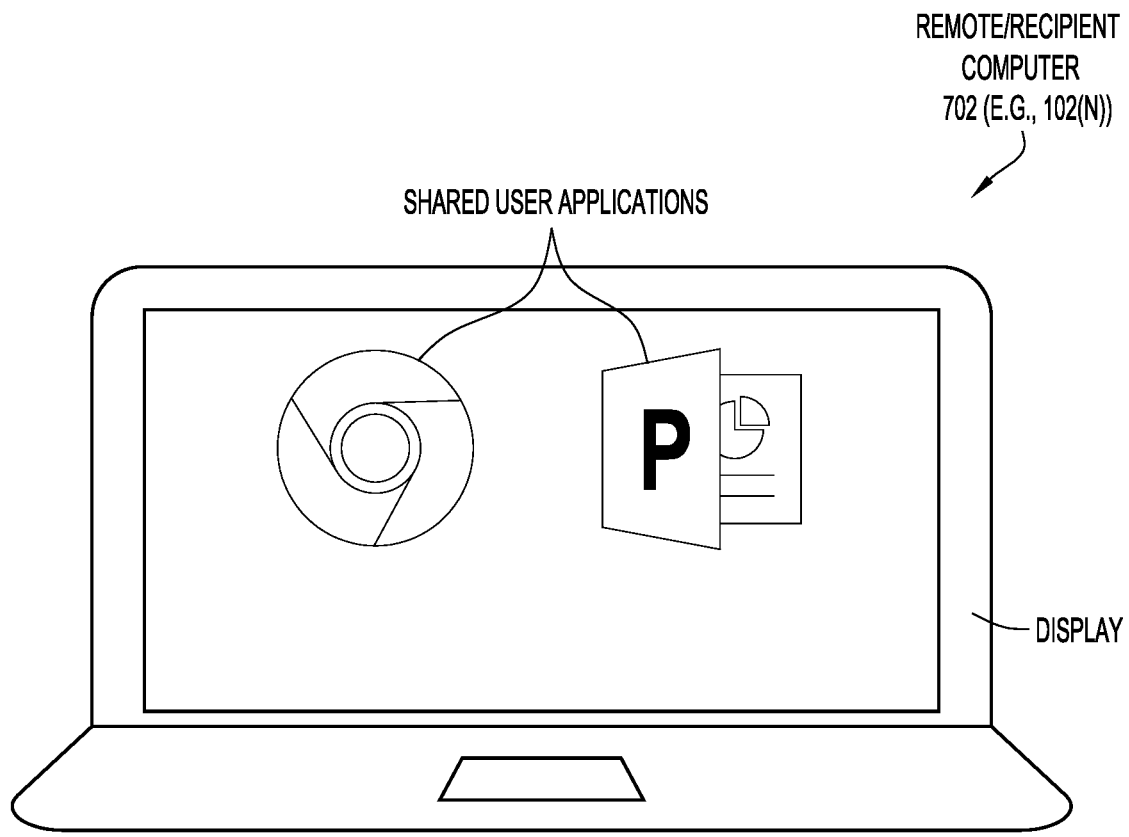
FIG. 7 is an illustration of screen content displayed on one of the other (remote) computer devices joined to the online meeting that results from share actions performed at the presenter computer device, according to an example embodiment.
FIG. 8 is an illustration of metadata updated to reflect that a user application has been moved from an unshared virtual desktop to a shared virtual desktop on the presenter computer device, according to an example embodiment.

In addition, responsive to the selection of virtual desktop 2 as the shared virtual desktop, the online meeting application scans the metadata (e.g., metadata 502) to determine/ identify all of the user applications that are part of virtual desktop 2. The scan indicates that Chrome and PowerPoint are in virtual desktop 2. Accordingly, the online meeting application starts sharing only virtual desktop 2, including only Chrome and PowerPoint, with the other/remote computers, as shown in FIG. 7. The online meeting application restricts sharing of screen content to only the screen content mapped to virtual desktop 2; no other screen content is shared with the other/remote computers. FIG. 7 is an illustration of example shared content presented on a display of (i.e., screen content presented on) one of the other/remote computers 702 joined to the online meeting, based on the above-described share actions performed on computer 402. The shared content includes Chrome and PowerPoint from virtual desktop 2 of computer 402.

While the online meeting application of computer 402 shares content (shown in FIG. 7) from shared virtual desktop 2, the user may access and perform actions with respect to currently unshared user applications in unshared virtual desktops 1 and 3 (e.g., the user may open, use, and close the other user applications using mouse/keyboard/touchscreen or other input/output devices). Such actions and the screen content associated with those actions remain private to the user; the online meeting application does not share that screen content with the other/remote computers. This is because the meeting application constrains sharing to (i) only the virtual desktop designated as the shared virtual desktop (e.g., virtual desktop 2) responsive to its earlier selection from the share menu, and (ii) only Chrome and PowerPoint, which are mapped to the shared virtual desktop by the metadata. Thus, the combination of the share designation and the metadata provide the online meeting application with an awareness of which virtual desktops and corresponding user applications should and should not be shared with the other computers, when the user accesses content that should be shared, and when the user accesses content that should not be shared.

Once the initial sharing of virtual desktop 2 has been established and is ongoing, the online meeting application provides the user with the capability to add previously unshared user applications to the ongoing sharing (i.e., to expand the current sharing), seamlessly, using screen drag and drop operations (e.g., by selecting, and then dragging, the unshared applications using a mouse). To support this capability, the online meeting application tracks user interactions (e.g., user focus and activity indicated by receipt of mouse selections, keyboard typing, touch screen input, and so on) with respect to the unshared user applications in unshared virtual desktops 1 and 3. A change in focus of the user interactions, from the shared user applications in shared virtual desktop 2 (e.g., the active virtual desktop) to the unshared user applications in unshared virtual desktop 1 or 3, triggers the online meeting application to poll, repeatedly, user interaction information/status maintained by computer 402 to determine detect/movement of any of the unshared (and shared) user applications between virtual desktops 1-3.

For example, when the user moves unshared Word from unshared virtual desktop 3 to shared virtual desktop 2 using a drag and drop operation, the aforementioned polling by the online meeting application detects the relocation of Word. Responsive to the detection, the online meeting application updates the metadata to reflect the relocation, as shown in FIG. 8. FIG. 8 is an illustration of metadata 502 updated to reflect that the user has moved Word from unshared virtual desktop 3 to shared virtual desktop 2. Each mapping entry/ line of updated metadata 502 includes a user application, an identifier of a "current" virtual desktop where the user application is currently located, and an identifier of a "previous" virtual desktop where the user application was previously located.

Once the metadata is updated to reflect that Word is now in shared virtual desktop 2 (i.e., the desktop number has changed from 3 to 2 for Word), the online meeting application automatically starts sharing Word concurrently with Chrome and PowerPoint, based on the metadata. That is, the online meeting application adds sharing of Word to the ongoing sharing. Note that Word is added to the ongoing sharing without any user actions other than dragging Word into shared virtual desktop 2. The user does not perform any explicit stop or start sharing operations to achieve the added sharing.

Figure 9:
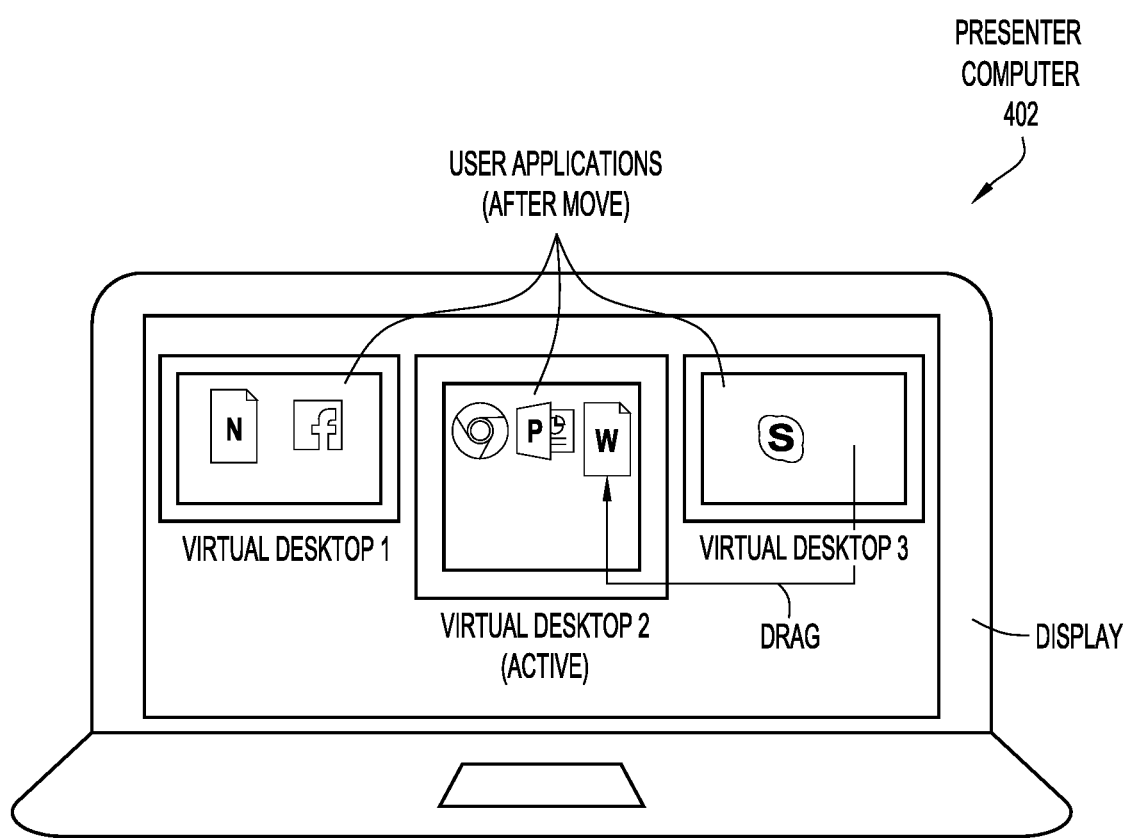
FIG. 9 is an illustration of screen content on the presenter computer device after the user application has been moved from the shared virtual desktop to the unshared virtual desktop, according to an example embodiment.

FIG. 9 is an illustration of screen content presented at computer 402 after previously unshared Word has been moved into shared virtual desktop and thus added to the sharing. As shown, shared virtual desktop 2 now includes Chrome, PowerPoint, and Word, while unshared virtual desktop 3 only includes Skype.

Figure 10:
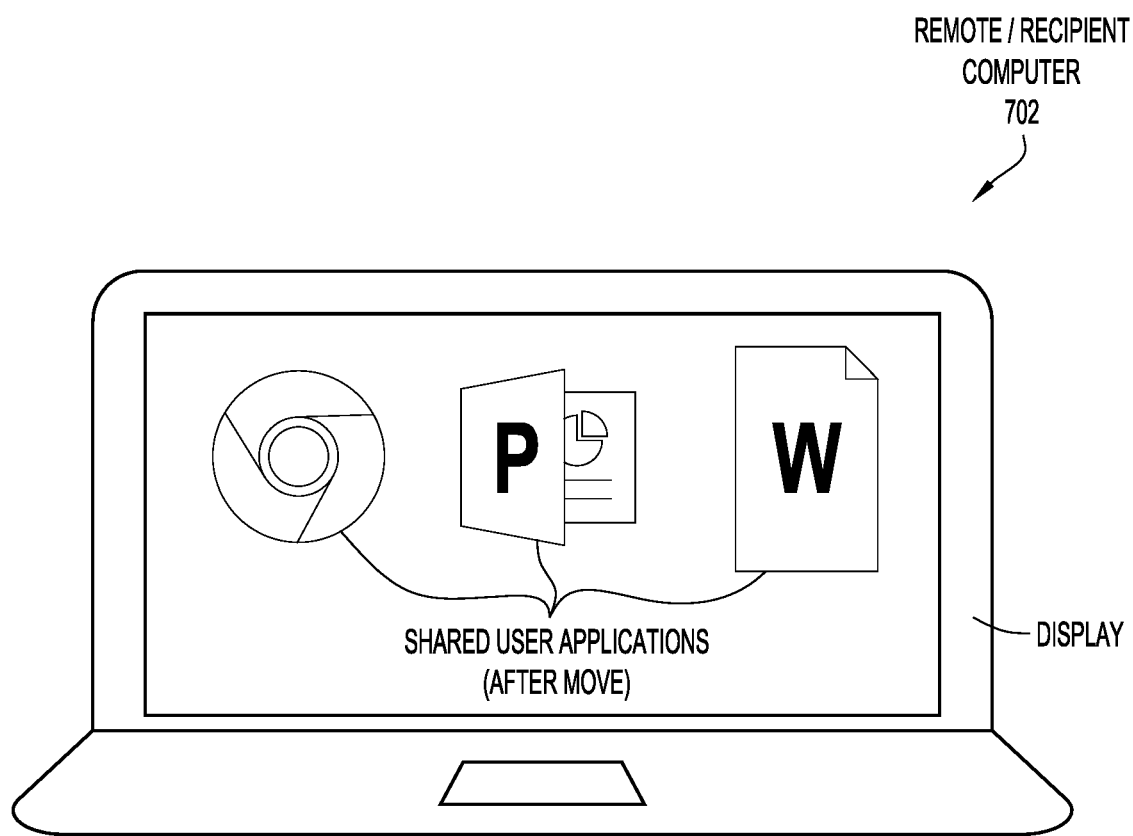
FIG. 10 is an illustration of screen content at one of the other computer devices joined to the online meeting after the user application has been added to the sharing based on the move, according to an example embodiment.

FIG. 10 is an illustration of screen content presented at remote computer 702 joined to the online meeting after Word has been moved and added to the sharing. As shown, the screen content now includes Chrome, PowerPoint, and Word.

Once the initial sharing described above has been established and is ongoing, the online meeting application additionally provides the user with the capability to remove shared user applications from the sharing, seamlessly, using screen drag and drop operations. For example, when the user drags a currently shared user application out of shared virtual desktop 2, the online meeting application detects the move, and updates the metadata to indicate that user application is no longer mapped to shared virtual desktop 2. Responsive to the updated metadata, the meeting application automatically stops sharing the user application that was moved.

In another embodiment, the user may dynamically create a separate/new virtual desktop containing various user applications to be shared. After creating the new virtual desktop, support logic on computer 402 automatically moves the online meeting application to the new virtual desktop, which is then shared, as described above. After the online meeting is ended, support logic associated with the online meeting application may "cleanup" any virtual desktop/space that the user has created using the online meeting application. To do this, the support logic moves the online meeting application from the created virtual desktop to its original virtual desktop before destroying the created virtual desktop. The metadata already contains information about the original virtual desktop, which supports the cleanup.

Figure 11:
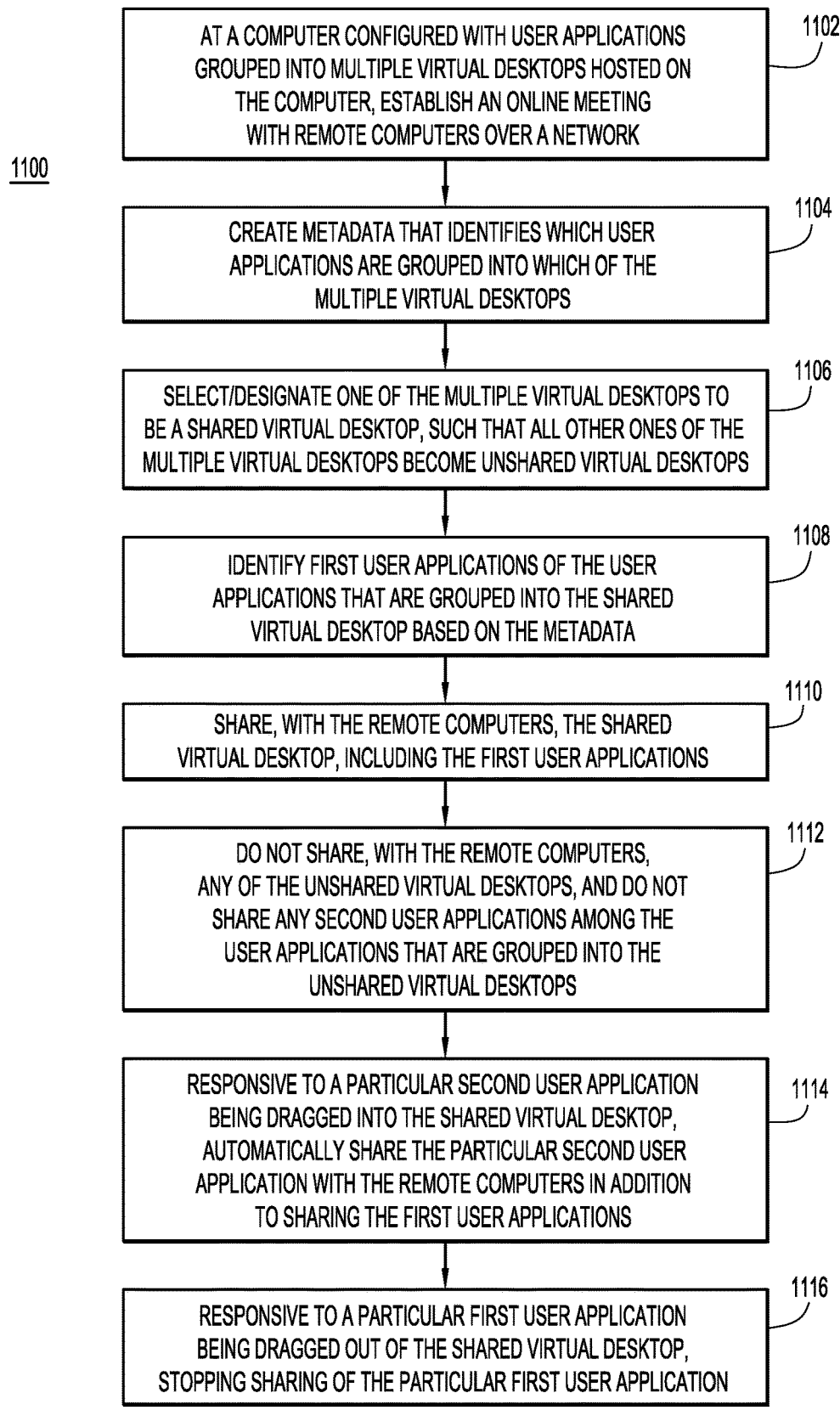
FIG. 11 is a flowchart of a method of screen sharing in an online meeting using virtual desktops, according to an example embodiment.

With reference to FIG. 11, there is a flowchart of an example method 1100 of screen sharing in an online meeting using virtual desktops. Method 1100 includes operations described above. The operations may be performed primarily by an online meeting application configured on a computer device. The computer device is configured with user applications grouped into multiple virtual desktops presented on a display of the computer device. That is, groups of one or more of the user applications are present in corresponding ones of the multiple virtual desktops.

At 1102, the computer device establishes an online meeting with remote computer devices over a network. The computer device and the remote computer devices each include a display to present screen content to a user.

At 1104, the computer device assigns distinct identifiers to the multiple virtual desktops, and creates metadata that identifies which of the user applications are grouped in which of the multiple virtual desktops. For example, the metadata includes mappings that map the distinct identifiers of the multiple virtual desktops to corresponding user applications that are grouped in the multiple virtual desktops.

At 1106, the computer device presents a share menu that lists the multiple virtual desktops as user selectable share options. Upon receiving a selection (i.e., an indication of the selection) of one of share options from the share menu (i.e., responsive to user input received by the computer device), the computer device selects one of the multiple virtual desktops corresponding to the selection to be a shared virtual desktop. The computer device designates the selected virtual desktop as the shared virtual desktop, and all other virtual desktops as unshared virtual desktops. In another embodiment, a shared virtual desktop may be created on the computer device and then designated as the shared virtual desktop by user interaction with the computer device.

Responsive to select operation 1106 (e.g., after designation of the shared and unshared virtual desktops), next operations 1108-1112 are performed automatically.

At 1108, the computer device scans the metadata to identify (i) first user applications among the user applications that are grouped into/presented by the shared virtual desktop based on the metadata, and (ii) second user applications among the user applications that are not grouped into the shared virtual desktop. That is, the computer devices identifies the first user applications and the second user applications based on the mappings in the metadata. In addition, the computer device determines whether the online meeting application is not in the shared virtual desktop. When the online meeting application is not in the shared virtual desktop, the online meeting user application is pushed or moved into the shared virtual desktop. When the online meeting application is in the shared virtual desktop, the push/move action is not performed on the online meeting application.

At 1110, the computer device shares the shared virtual desktop, including only the first user applications and their associated content in the shared virtual desktop, with the remote computer devices. That is, the computer device transmits rendered data representative of all screen content associated with the shared virtual desktop to the remote computer devices over the network. The sharing results in presentation of the screen content at the remote computers.

At 1112, the computer device does not share any of the unshared virtual desktops, and does not share any of the second user applications grouped into the unshared virtual desktops, with the remote computer devices. The unshared virtual desktops remain private at the computer device. For example, while the sharing of 1110 is ongoing, responsive to user action to access screen content in one of the unshared virtual desktops, the screen content is displayed on the computer device, but not shared with the remote computer devices.

At 1114, responsive to a particular second user application among the second user applications being dragged from one of the unshared virtual desktops into the shared virtual desktop by the user, the computer device automatically begins sharing the particular second user application with the remote computer devices in addition to sharing the shared virtual desktop and the first user applications.

At 1116, responsive to a particular first user application among the first user applications being dragged out of the shared virtual desktop by the user, the computer device stops sharing the particular first user application.

Figure 12:
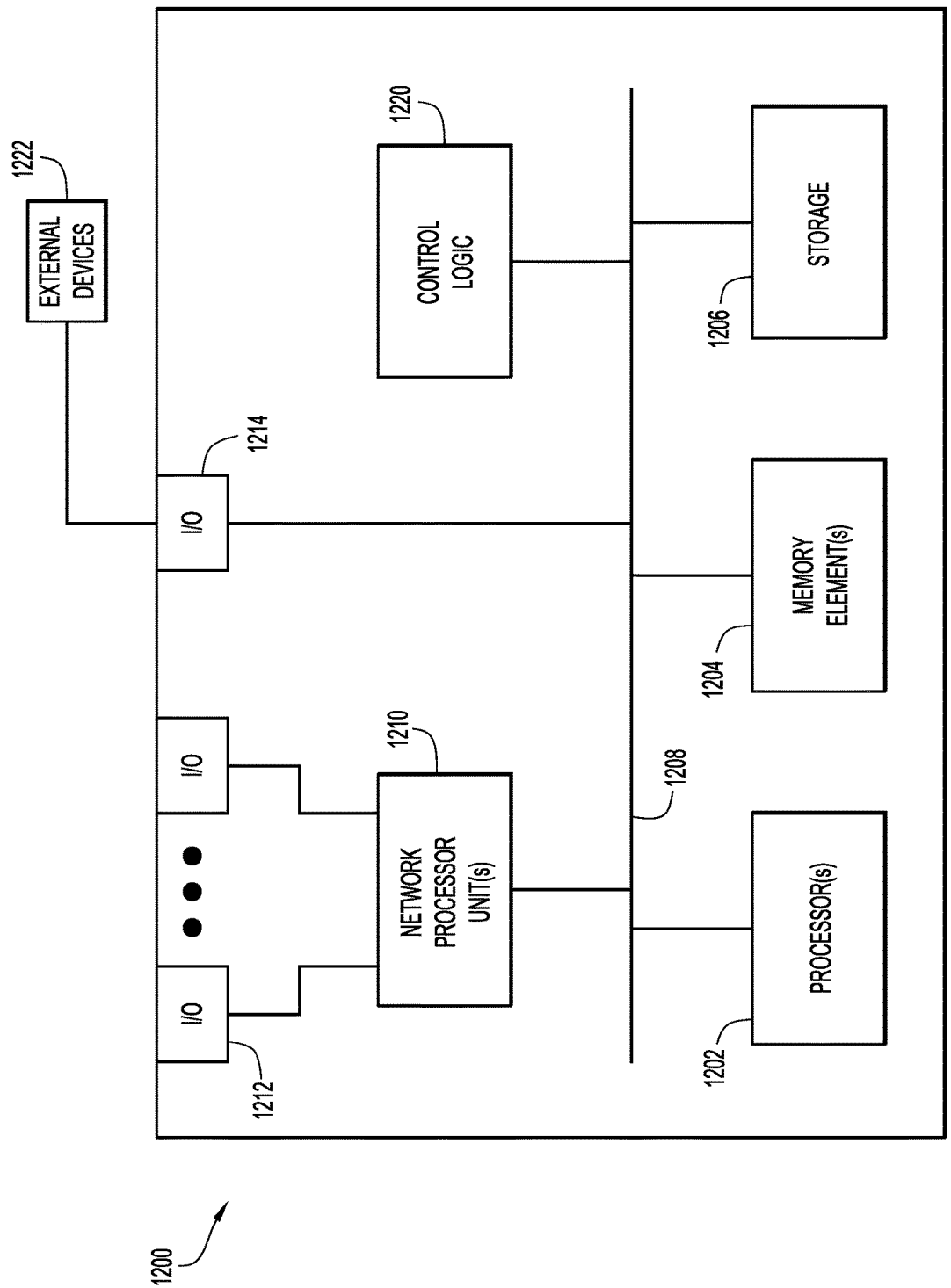
FIG. 12 illustrates a hardware block diagram of a computing device that may perform functions associated with screen content sharing operations described herein, according to an example embodiment.

Referring to FIG. 12, FIG. 12 illustrates a hardware block diagram of a computing device 1200 that may perform functions associated with operations discussed herein in connection with the techniques depicted in FIGS. 1 and 4-11. In various embodiments, a computing device, such as computing device 1200 or any combination of computing devices 1200, may be configured as any entity/entities, e.g., a computer device 102(*i*), as discussed for the techniques depicted in connection with FIGS. 1 and 4-11 in order to perform operations of the various techniques discussed herein.

In at least one embodiment, the computing device 1200 may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for computing device 1200 can overlap in any manner and are not limited to the specific allocation of instructions and/or operations described herein.

In at least one embodiment, processor(s) 1202 is/are at least one hardware processor configured to execute various tasks, operations and/or functions for computing device 1200 as described herein according to software and/or instructions configured for computing device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, bus 1208 can be configured as an interface that enables one or more elements of computing device 1200 to communicate in order to exchange information and/or data. Bus 1208 can be implemented with any architecture designed for passing control, data and/or information between processors, memory elements/storage, peripheral devices, and/or any other hardware and/or software components that may be configured for computing device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 (wired and/or wireless) to facilitate operations discussed for various embodiments described herein. In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1212 can be configured as one or more Ethernet port(s), Fibre Channel ports, any other I/O port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information with other entities that may be connected to computer 1200. For example, I/O interface(s) 1214 may provide a connection to external devices 1222 such as a keyboard, keypad, a touch screen, and/or any other suitable input and/or output device now known or hereafter developed. In some instances, external devices 1222 can also include portable computer readable (non-transitory) storage media such as database systems, thumb drives, portable optical or magnetic disks, and memory cards. In still some instances, external devices 1222 can be a mechanism to display data to a user, such as, for example, a computer monitor, a display screen, or the like.

In various embodiments, control logic 1220 (e.g., an online meeting application and supporting logic, including logic to generate and display user interfaces) can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11

(e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided comprising: at a computer device configured with user applications grouped in multiple virtual desktops that are hosted on and displayed by the computer device: establishing an online meeting with remote computer devices over a network; responsive to user input, selecting one of the multiple virtual desktops to be a shared virtual desktop, such that all other ones of the multiple virtual desktops become unshared virtual desktops; sharing, with the remote computer devices, the shared virtual desktop, including first user applications of the user applications that are grouped in the shared virtual desktop; and not sharing, with the remote computer devices, any of the unshared virtual desktops and second user applications of the user applications that are grouped in the unshared virtual desktops.

In another form, an apparatus is provided comprising: a network input/output interface to communicate with a network; and a processor coupled to the network input/output interface and configured to perform: generating, for display, multiple virtual desktops hosted by the processor and in which representation of user applications are grouped; establishing an online meeting with remote computer devices over the network; responsive to user input, selecting one of the multiple virtual desktops to be a shared virtual desktop, such that all other ones of the multiple virtual desktops become unshared virtual desktops; sharing, with the remote computer devices, the shared virtual desktop, including first user applications of the user applications that are grouped in the shared virtual desktop; and not sharing, with the remote computer devices, any of the unshared virtual desktops and second user applications of the user applications that are grouped in the unshared virtual desktops.

In yet another form, a non-transitory computer readable medium is provided. The computer readable medium stores instructions that, when executed by a processor of a computer device configured with user applications grouped in multiple virtual desktops hosted and displayed by the computer device, cause the processor to perform: establishing an online meeting with remote computer devices over a network; responsive to user input, selecting one of the multiple virtual desktops to be a shared virtual desktop, such that all other ones of the multiple virtual desktops become unshared virtual desktops; sharing, with the remote computer devices, the shared virtual desktop, including first user applications of the user applications that are grouped in the shared virtual desktop; and not sharing, with the remote computer devices, any of the unshared virtual desktops and second user applications of the user applications that are grouped in the unshared virtual desktops.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a computer device configured with user applications, including an online meeting application, grouped in multiple virtual desktops that are hosted on and displayed by the computer device:
   establishing an online meeting with remote computer devices over a network;
   responsive to user input, selecting one of the multiple virtual desktops to be a shared virtual desktop such that all other ones of the multiple virtual desktops become unshared virtual desktops, identifying first user applications grouped in the shared virtual desktop, and determining that the online meeting application is not grouped in the shared virtual desktop;
   pushing the online meeting application to the shared virtual desktop;
   sharing, with the remote computer devices, the shared virtual desktop, including the first user applications and the online meeting application; and
   not sharing, with the remote computer devices, the unshared virtual desktops and second user applications of the user applications that are grouped in the unshared virtual desktops.

2. The method of claim 1, further comprising:
   creating metadata that identifies which of the user applications are grouped in which of the multiple virtual desktops; and
   responsive to selecting, identifying the first user applications based on the metadata.

3. The method of claim 2, wherein:
   creating the metadata includes creating mappings that map distinct identifiers for the multiple virtual desktops to corresponding user applications that are in the multiple virtual desktops.

4. The method of claim 1, further comprising:
   responsive to a particular second user application of the second user applications being dragged from one of the unshared virtual desktops into the shared virtual desktop, automatically sharing the particular second user application with the remote computer devices in addition to sharing the first user applications.

5. The method of claim 1, further comprising:
   responsive to a particular first user application of the first user applications being dragged out of the shared virtual desktop, stopping sharing the particular first user application.

6. The method of claim 1, further comprising, at the computer device:
   responsive to user action to access screen content in one of the unshared virtual desktops:
     displaying the screen content on the computer device;
     not sharing the screen content with the remote computer devices; and
     continuing to perform the sharing.

7. The method of claim 1, further comprising, at the computer device:
   presenting user selectable options corresponding to the multiple virtual desktops; and
   upon receiving a user selection of one of the user selectable options, performing selecting in accordance with the user selection.

8. The method of claim 1, further comprising:
   performing establishing, selecting, sharing, not sharing, and automatically sharing using the online meeting application.

9. The method of claim 8, further comprising:
   after selecting, determining that the online meeting application is not in the shared virtual desktop; and
   responsive to determining, pushing the online meeting application to the shared virtual desktop.

10. An apparatus comprising:
    a network input/output interface to communicate with a network; and
    a processor coupled to the network input/output interface and configured to perform:
      generating, for display, multiple virtual desktops hosted by the processor and in which representation of user applications are grouped;
      using an online meeting application hosted by the processor, establishing an online meeting with remote computer devices over the network;
      responsive to user input, selecting one of the multiple virtual desktops to be a shared virtual desktop, such that all other ones of the multiple virtual desktops become unshared virtual desktops;

after selecting, upon determining that the online meeting application is not in the shared virtual desktop, pushing the online meeting application to the shared virtual desktop;

sharing, with the remote computer devices, the shared virtual desktop, including first user applications of the user applications that are grouped in the shared virtual desktop; and not sharing, with the remote computer devices, any of the unshared virtual desktops and second user applications of the user applications that are grouped in the unshared virtual desktops.

11. The apparatus of claim 10, wherein the processor is further configured to perform:

creating metadata that identifies which of the user applications are grouped in which of the multiple virtual desktops; and responsive to selecting, identifying the first user applications based on the metadata.

12. The apparatus of claim 11, wherein the processor is configured to perform creating the metadata by creating mappings that map distinct identifiers for the multiple virtual desktops to corresponding user applications that are in the multiple virtual desktops.

13. The apparatus of claim 10, wherein the processor is further configured to perform:

responsive to a particular second user application of the second user applications being dragged from one of the unshared virtual desktops into the shared virtual desktop, automatically sharing the particular second user application with the remote computer devices in addition to sharing the first user applications.

14. The apparatus of claim 10, wherein the processor is further configured to perform:

responsive to a particular first user application of the first user applications being dragged from the shared virtual desktop into one of the unshared virtual desktops, stopping sharing of the particular first user application.

15. The apparatus of claim 10, wherein the processor is further configured to perform:

responsive to user action to access screen content in one of the unshared virtual desktops:
generating for display the screen content;
not sharing the screen content with the remote computer devices; and
continuing to perform the sharing.

16. The apparatus of claim 10, wherein the processor is further configured to perform:

generating, for display, user selectable options corresponding to the multiple virtual desktops; and upon receiving an indication that one of the user selectable options is selected, performing selecting in accordance with the indication.

17. The apparatus of claim 10, wherein the processor is further configured to perform:

performing establishing, selecting, sharing, not sharing, and automatically sharing using the online meeting application.

18. A non-transitory computer readable medium encoded with instructions that, when executed by a processor of a computer device configured with user applications, represented as icons, grouped in multiple virtual desktops hosted and displayed by the computer device, cause the processor to perform:

establishing an online meeting with remote computer devices over a network using an online meeting application;

responsive to user input, selecting one of the multiple virtual desktops to be a shared virtual desktop such that all other ones of the multiple virtual desktops become unshared virtual desktops, and identifying first user applications grouped in the shared virtual desktop;

upon determining that the online meeting application is not in the shared virtual desktop, pushing the online meeting application to the shared virtual desktop;

sharing, with the remote computer devices, the shared virtual desktop, including the first user applications and the online meeting application; and not sharing, with the remote computer devices, the unshared virtual desktops and second user applications of the user applications that are grouped in the unshared virtual desktops.

19. The non-transitory computer readable medium of claim 18, further comprising instructions to cause the processor to perform:

creating metadata that identifies which of the user applications are grouped in which of the multiple virtual desktops; and responsive to selecting, identifying the first user applications based on the metadata.

20. The non-transitory computer readable medium of claim 18, further comprising instructions to cause the processor to perform:

responsive to a particular first user application of the first user applications being dragged out of the shared virtual desktop, stopping sharing the particular first user application.

* * * * *